United States Patent [19]
Webber et al.

[11] Patent Number: 5,462,307
[45] Date of Patent: Oct. 31, 1995

[54] SUPPLEMENTAL INFLATION RESTRAINT INFLATOR

[75] Inventors: James L. Webber, Centerville; Francis J. Holmes, Beavercreek, both of Ohio

[73] Assignee: General Motors Corporation, Detroit, Mich.

[21] Appl. No.: 363,790

[22] Filed: Dec. 27, 1994

[51] Int. Cl.⁶ ................................................. B60R 21/26
[52] U.S. Cl. ............................................ 280/737; 222/5
[58] Field of Search ................................. 280/736, 737, 280/741, 742, 740; 222/5; 102/530, 531; 422/164–166

[56] References Cited

U.S. PATENT DOCUMENTS

| | | | |
|---|---|---|---|
| 3,968,980 | 7/1976 | Hay | 222/5 |
| 5,022,674 | 6/1991 | Frantom et al. | 280/741 |
| 5,031,932 | 7/1991 | Frantom et al. | 280/741 |
| 5,033,772 | 7/1991 | Frantom et al. | 280/737 |
| 5,060,974 | 10/1991 | Hamilton et al. | 280/736 |
| 5,078,422 | 1/1992 | Hamilton et al. | 280/736 |
| 5,116,080 | 5/1992 | Wipasuramonton | 280/741 |
| 5,131,680 | 7/1992 | Coultas et al. | 280/737 |
| 5,184,846 | 2/1993 | Goetz | 280/736 |
| 5,199,740 | 4/1993 | Frantom et al. | 280/736 |
| 5,226,561 | 7/1993 | Hamilton et al. | 222/5 |
| 5,230,531 | 7/1993 | Hamilton et al. | 280/737 |
| 5,259,643 | 11/1993 | Kraft et al. | 280/740 |
| 5,263,740 | 11/1993 | Frey et al. | 280/737 |
| 5,273,312 | 12/1993 | Coultas et al. | 280/737 |

*Primary Examiner*—Margaret A. Focarino
*Assistant Examiner*—Paul N. Dickson
*Attorney, Agent, or Firm*—Ernest E. Helms

[57] ABSTRACT

A hybrid air bag inflator is provided including an elongated first pressure chamber storing a compressed gas with first and second apertures; a first membrane sealing the first aperture; a second membrane for sealing the second aperture; a tube fluidly connecting with the first aperture and extending a substantial portion of the length of the first pressure chamber; a second pressure chamber mounted adjacent the first pressure chamber exposed to the first membrane; an igniter within the second chamber; a pyrotechnic material packaged within the second pressure chamber; a piston with a first end mounted in the tube and a second end for puncturing the second membrane, the piston being held in position within the central opening of the diffuser cap by a rupturable retainer; and a deflector ring mounted on the piston and encircling the same.

7 Claims, 1 Drawing Sheet

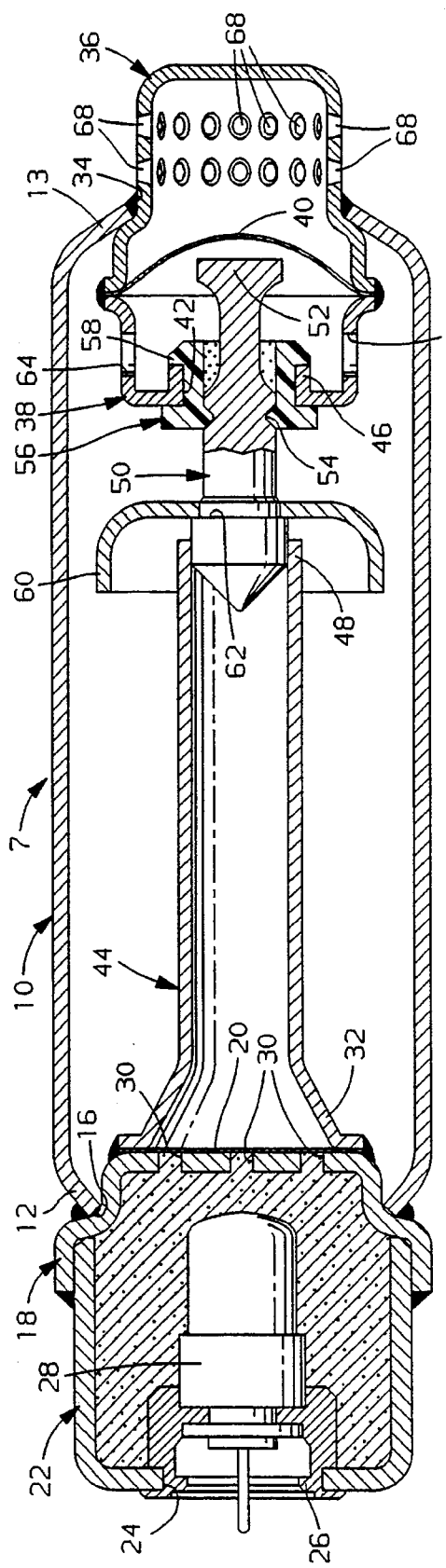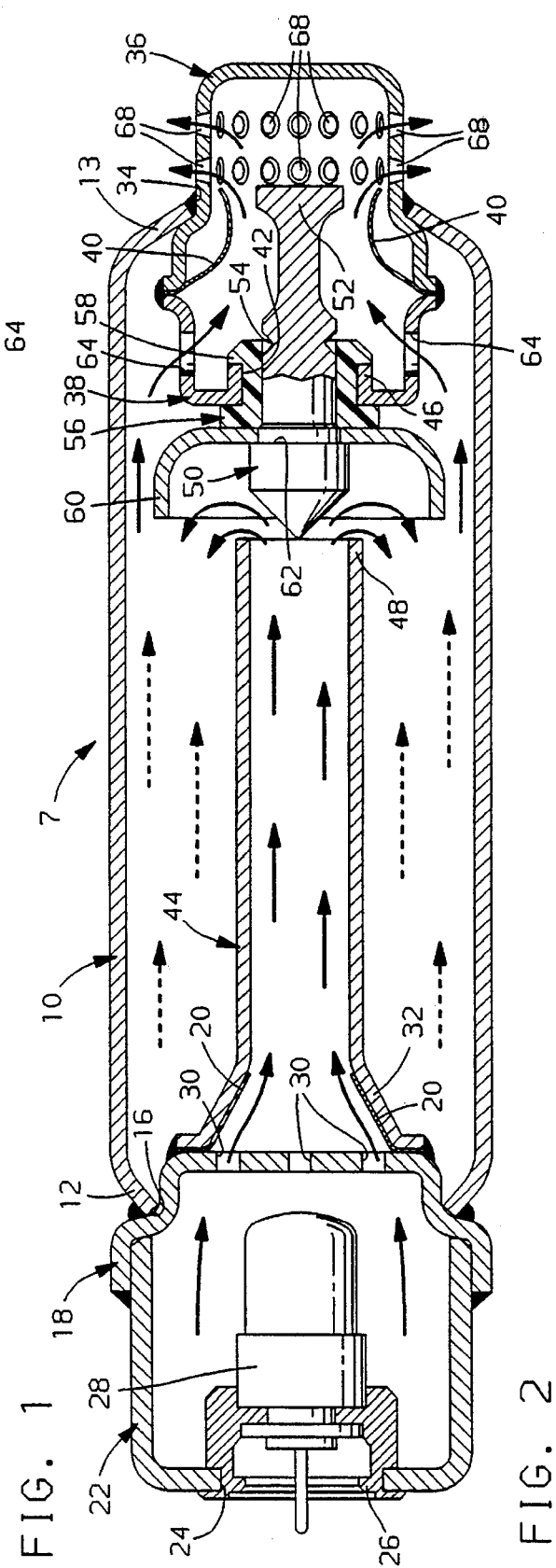
FIG. 1
FIG. 2

SUPPLEMENTAL INFLATION RESTRAINT INFLATOR

FIELD OF THE INVENTION

The field of the present invention is that of supplemental inflation restraint (SIR) hybrid inflators, commonly referred to as air bag inflators. Hybrid air bag inflators generate a compressible gas for an air bag assembly which is a combination of stored compressed gas and gas emanating from a pyrotechnic charge.

BACKGROUND OF THE INVENTION

There are two inflation technologies currently used for air bags. The most commonly used technology is sodium azide-based pyrotechnic. The other technology is called a hybrid because it utilizes an inert compressed gas coupled with a pyrotechnic heater. Upon ignition, the pyrotechnic heater causes the stored gas to expand. This expanding gas fills the air bag cushion to provide occupant restraint. Currently, hybrid driver side air bag inflators are mainly made with a torroidal steel gas bottle and a separate chamber for the heater material.

Hybrid inflators are typically more desirable than a simple pyrotechnic inflator due to their lower cost. The most important problem in the driver side inflator is mass. Currently, most hybrid driver side inflators are over 250 grams heavier than conventional pyrotechnic inflators.

It is preferable that the pyrotechnic charge not be in pressure volume as the stored gas since the pyrotechnic material will take up space which would be more readily used for compressed gas. Secondly, pyrotechnic material held within a pressurized, typically inert gas is much harder to ignite.

Furthermore, it is also preferable that machined surfaces be avoided in the gas pressure volume since machine components must utilize material of a more expensive high purity type since cheaper materials which can be made into stampings often contain metal impurity runners which allow pressurized gas to leak through.

SUMMARY OF THE INVENTION

To meet the above-noted challenges, the present invention is brought forth. The present invention is an air bag inflator primarily for the driver side which is based on a cylinder rather than a torroidal shape. The inflator mass is reduced by using high strength tubing for the majority of the pressure vessel. The configuration also allows for a sequential release of cold gas followed by heated gas. To promote the more even mixture of heated gas, there is a central tube through which all of the hot gas passes to the opposite end of the pressure vessel. The hot gases are then deflected rearwardly toward the originating end, thereby maximizing proper heat transfer and minimizing the total amount of pyrotechnic needed to generate a given volume of pressurized gas.

Other advantages of the present invention will become apparent to those skilled in the art as the invention is brought forth in the accompanying drawings and detailed description.

BRIEF DESCRIPTION OF THE DRAWINGS

FIG. 1 is a sectional view of a preferred embodiment driver side air bag inflator according to the present invention.

FIG. 2 is a view similar to FIG. 1 showing operation of the air bag inflator shown in FIG. 1.

DESCRIPTION OF THE PREFERRED EMBODIMENT

Referring to FIGS. 1 and 2, the air bag inflator 7 according to the present invention has a main cylinder 10 which forms a first pressure chamber therein. The main cylinder 10 may be fabricated from a stamped steel high pressure tubing and has a first end 12 and a second end 13. First end 12 has a first aperture 16 which is sealed by a bowl-shaped stamping 18 and a first membrane 20. The first membrane 20 is made from INCONEL 625 stainless steel, typically 0.15 mm thick.

Joined to the stamping 18 by welding or other suitable manner is a stamping 22. Stamping 22 has an opening 24 which holds a mounting 26. The mounting 26 is made of a steel material and holds a squib and booster 28. The squib ignites a booster material in response to an electrical signal (typically current related) given by an air bag controller (not shown) in response to a crash situation. Surrounding the squib and booster 28 is a pyrotechnic material such as polyvinyl chloride potassium perchlorate (pvc/kcl 04). The stampings 22 and 18 provide a second pressure chamber which is exposed to the membrane 20 adjacent the first end 12 of the main pressure chamber. Covering the various apertures 30 provided in the stamping 18 is a base 32 of a funnel tube 44. The funnel tube 44 is made from a steel extrusion and extends a substantial portion of the length of the first pressure chamber 10 extended toward a second aperture 34 provided in the first pressure chamber second end 13.

The second aperture 34 has mounted therein a diffuser cap made from steel stampings 36 and 38. Stampings 36 and 38 mount between them a second membrane 40 made from INCONEL stainless steel of a 0.4 mm thickness. The second membrane 40 seals the second aperture 34 of the first pressure chamber 10 from the outside atmosphere. Stamping 38 has a central aperture 42 bordered by a flange member 46.

Mounted in an end 48 of the funnel tube most adjacent to the second end 13 of the main pressure chamber 10 is a piston 50. Piston 50 has a head 52 for rupturing the second membrane 40. Piston 50 also has a groove 54 which allows the piston to be grabbed by a plastic retainer piece 56. Plastic retainer piece 56 has a head 58 which snap fits into the flange 46 of the diffuser cap.

Joined to and surrounding the piston 50 is a deflector ring 60. The deflector ring, if desired, may also be made by a stamping. The piston has a shoulder 62 upon which the deflector ring 60 abuts. The piston 50 is made from a steel material.

In operation during a crash, the squib 28 receives an electrical signal that a crash has occurred. The squib ignites a booster material, which in turn ignites the pyrotechnic material held within the second pressure chamber. The pyrotechnic material generates heat and pressurized gas which burst through first membrane 20, flowing toward the first pressure chamber second end 13. The pressurized gas urges the piston 50 forward, severing the retainer 56 and causing the head 52 to puncture the second membrane 40. Upon the puncturing of second member 40, initially the stored pressurized gas (typically argon), which is cold, is allowed to leak out past opening 64 and 68 provided in the diffuser cap to inflate the air bag. This operation is preferable since the gas is cool. The initial fill is at a low flow rate. Hot gas also impinges on the deflector plate and is diverted toward the inflator first end 12, thereby more uniformly mixing and heating the remaining argon gas. By virtue of the deflector, the heating of the argon gas is much more efficient, thereby minimizing the amount of pyrotechnic material needed to inflate a given air bag.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A hybrid air bag inflator for filling an air bag with compressible gas comprising:

an elongated pressure chamber having stored therein a compressed gas having a first end and a second end with first and second apertures, respectively, at the first and second ends;

a first membrane sealing the first aperture;

a second membrane sealing the second end;

a tube connected with the first end of the first pressure chamber having a base fluidly connecting with the first aperture, the tube extending a substantial portion of the length of the first pressure chamber in a direction toward the first pressure chamber second end;

a second pressure chamber mounted adjacent the first pressure chamber first end and exposed to the first membrane;

an igniter responsive to a signal positioned within the second chamber;

a pyrotechnic material packaged within the second chamber;

a piston with a first end mounted in the tube and a second end for puncturing the second membrane when the igniter has lit the pyrotechnic material in the second pressure chamber, causing generation of heated gases and rupture of the first membrane, and for hot gases to move through the tube toward the first pressure chamber first end, causing a pressure force to be exerted on the piston, thereby causing the piston to move toward the first pressure chamber second end and puncture the second membrane; and a deflector ring mounted within the first pressure chamber between the first pressure chamber second end and an end of the tube most adjacent the first pressure chamber second end, the deflector ring encircling the piston and directing the heated gas flowing in the tube toward the first pressure chamber second end to reverse and flow toward the first end of the first pressure chamber.

2. An air bag inflator as described in claim 1 wherein the deflator is carried on the piston.

3. An air bag inflator as described in claim 1 wherein the second end of the first pressure chamber has a diffuser cap mounted therein and the diffuser cap mounts the second membrane.

4. An air bag inflator as described in claim 3 wherein the diffuser cap, the first pressure chamber and the second pressure chamber are essentially fabricated from stampings.

5. An air bag inflator as described in claim 3 wherein the diffuser cap has an end inserted within the first pressure chamber which mounts an end of the piston.

6. An air bag inflator as described in claim 5 further including a breakable retainer mounted in the diffuser cap for holding the piston.

7. A hybrid air bag inflator for filling an air bag with compressible gas comprising:

an elongated stamped metal first pressure chamber storing a compressed gas having a first end and a second end with first and second apertures, respectively, at the first and second ends;

a first membrane sealing the first end;

a diffuser cap made from a stamping mounted in the second end of the stamping of the first pressure chamber, the diffuser cap mounting a second membrane for sealing the second aperture of the first pressure chamber, the diffuser cap also having within the first pressure chamber a central opening;

a funnel tube connected with the first end of the first pressure chamber having a base fluidly connecting with the first aperture, the funnel tube extending a substantial portion of the length of the first pressure chamber in a direction toward the first pressure chamber second end;

a second pressure chamber mounted adjacent the first pressure chamber first end and exposed to the first membrane;

an igniter responsive to a signal positioned within the second chamber;

a pyrotechnic material packaged within the second pressure chamber;

a piston with a first end mounted in the funnel tube and a second end for puncturing the second membrane, the piston being held in position within the central opening of the diffuser cap by a rupturable retainer, the piston second end rupturing the second membrane when the igniter has lit the pyrotechnic material and the second pressure chamber, causing generation of heated gases and rupture of the first membrane and a pressure force to be exerted on the piston from the hot gases flowing toward the second pressure chamber second end, causing the piston to break away from the retainer and move toward the first pressure chamber first end; and a deflector ring mounted on the piston and encircling the same between the end of the funnel tube most adjacent to the first chamber second end and the diffuser cap, the deflector ring directing the heated gas flowing in the funnel robe toward the first pressure chamber second end to reverse and flow toward the first end of the first pressure chamber.

* * * * *